No. 832,872. PATENTED OCT. 9, 1906.
W. J. MITCHELL.
FEEDER ATTACHMENT FOR FEED CUTTERS.
APPLICATION FILED NOV. 23, 1905.
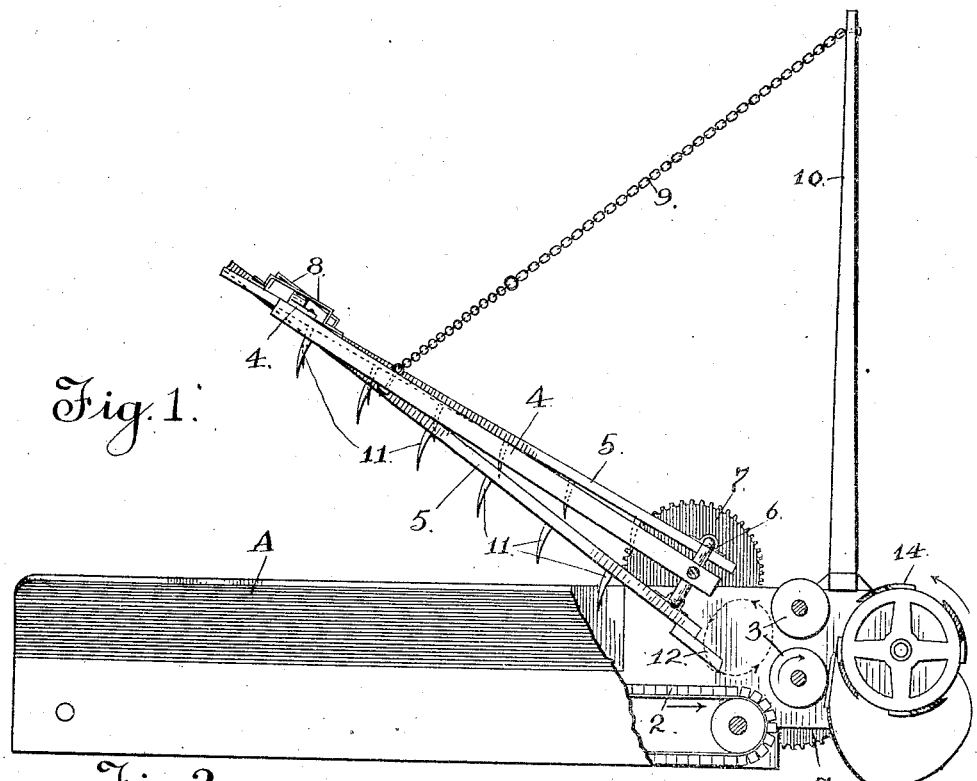
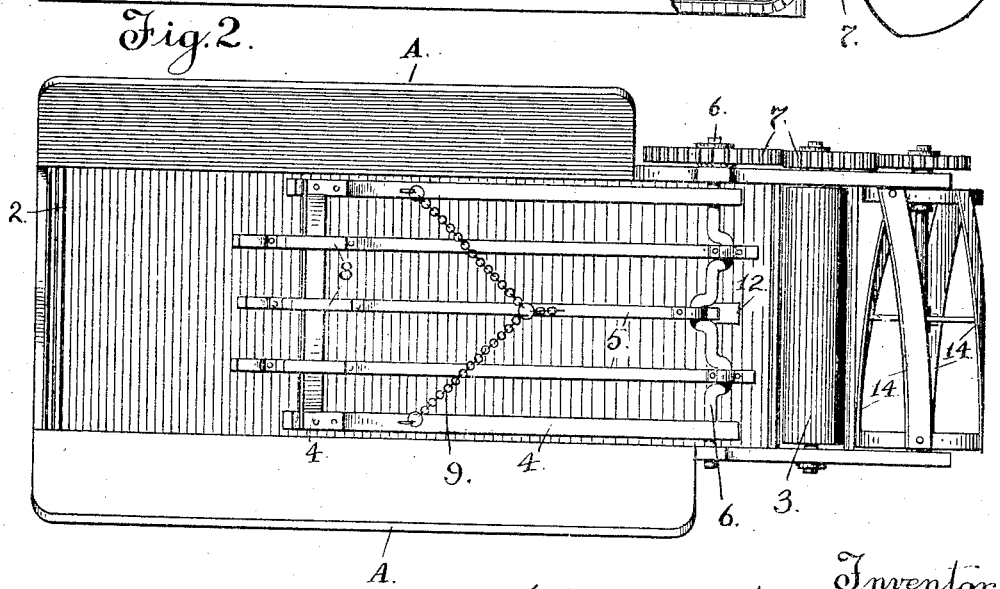

UNITED STATES PATENT OFFICE.

WILLIAM J. MITCHELL, OF SAN FRANCISCO, CALIFORNIA.

FEEDER ATTACHMENT FOR FEED-CUTTERS.

No. 832,872.　　　　Specification of Letters Patent.　　　　Patented Oct. 9, 1906.

Application filed November 23, 1905. Serial No. 288,702.

*To all whom it may concern:*

Be it known that I, WILLIAM J. MITCHELL, a citizen of the United States, residing in the city and county of San Francisco and State of California, have invented new and useful Improvements in Feeder Attachments for Feed-Cutters, of which the following is a specification.

My invention relates to a feeder attachment for feed-cutters, such as are used for cutting ensilage, fodder, hay, straw, and other material. Its object is to provide a simple practical device for feeding hay or other material to the feed cutters or choppers, which device will operate to compress the material and force it between the feed-rollers, which will lessen the danger now present in attending feed-cutting machines, and which device at the same time will greatly increase the capacity of a machine and reduce labor and expense.

The invention consists of the parts and the construction and the combination of parts, as hereinafter more fully described and claimed, having reference to the accompanying drawings, in which—

Figure 1 is a side elevation of the invention, partly broken away. Fig. 2 is a plan view of same.

A represents the feed-trough of a feed-cutter such as is ordinarily used for cutting hay or the like. This trough is preferably arranged with flared sides in the usual manner, as shown, and it may have either a stationary or a movable bottom. In the present instance I have represented the trough as having a traveling feed apron or table 2, operating to carry material to be cut to the feed-rollers 3, whence it is delivered to the cutting-knives 14.

My invention comprises a frame 4, hinged to the cutter-frame proximate to the feed-rollers and having one or more reciprocating feed-bars 5, arranged at a suitable angle relative to the table and coöperating with the latter to compress the loose feed stuff and force it between the rollers.

The frame and feed-bars are shown as hung on the crank-shaft 6, which may be operated from any suitable source of power. I have here shown for convenience of illustration the shaft 6 and the feed-rollers as being driven in unison through the interconnecting gears 7.

The bars 5 connect at their rear ends to the crank-shaft 6, while their front elevated ends are supported loose on a cross-bar of frame 4 by means of the loops or straps 8. These straps are of suitable size and shape to permit of the proper reciprocatory movement of the bars and to provide for a limited oscillatory movement of the bars about their pivots on the crank-shaft independent of the frame 4.

The frame is supported at any suitable angle relative to the table by any appropriate means, such as the chain 9, attached to a suitable fixed support 10.

The feed-bars 5 are supplied with teeth 11, which are set at a suitable angle to draw or gather the hay preparatory to feeding it forward, and these teeth may be either straight, curved, rigid, or flexible.

There may be any number of feed-bars, and the bars may be of any suitable length, depending on the size of the machine and the character of the material to be cut. Likewise the number and size of the teeth may vary. Preferably where a plurality of bars are used they are so arranged that certain bars will act alternately with the other bars, so that while one bar is feeding forward the other bars are sliding back over the material in order to take a fresh hold. In the present instance I have only shown three bars, with the two outside bars operating alternately with the intermediate bar, the main work of feeding to the rollers being done by the middle bar, while the outside bars serve to draw in the material at the edges of the trough. The central feed-bar is preferably provided with an underneath pusher projection 12, which presses down onto the material at each downward and forward stroke of the bar to compress the material and push it up into the range of the feed-rollers. This pusher may consist of a flat piece of board three or four inches, more or less, in width. In large machines there may be a plurality of these pushers.

In operation the frame 4 is lifted and supported at a suitable angle relative to the table. Usually it is arranged at an angle of about thirty-five degrees, more or less. The machine and bars 5 being set in motion, the loose material is piled into the trough, and as it is acted on by the table and by the constant reciprocating action of the bars 5 it is drawn downward and compressed into a comparatively thin compact mass and pushed and driven forward into engagement with the feed-rollers. It is this compacting and compressing of the material that renders the apparatus of special value and gives me the desired action and the desired increase in capacity. The shaft 6 is rotated, so that the feed-bars will compress the material on each downward and forward stroke. On the back stroke of the bars the three or four inch play, more or less, allowed by the straps 8 permits the limited oscillation of the bars, so that the teeth draw out of and ride over the material, and thereby prevent the teeth so becoming locked in the material as to cause the latter to slide back and forth with the bars. If all the bars moved in the same direction at the same time and if the bars were not permitted this oscillatory movement, there would be a tendency for the material to cling to the bars and not be fed in the manner desired. The resulting action of the feed-bars and crank-shaft is to contract the bulk of the material and pack the same ready for the pusher 12 to force it between the rollers, which latter are enabled thereby to get a better hold on the material to feed it forward to the knives.

Having thus described my invention, what I claim, and desire to secure by Letters Patent, is—

1. The combination with feed-rollers, of a feed-table, a conveyer comprising toothed bars having a combined reciprocal and oscillatory movement said bars being pivotally mounted at the end nearest the feed-rollers and arranged at an incline relative to the feed-table and proximate to the feed-rollers and having means coöperating with the table to compact the loose material and force it between the feed-rollers, and means for operating said conveyer.

2. The combination with feed-rollers, of a feed-table, a crank-shaft mounted proximate to the rollers, a frame pivotally supported on said shaft, feed-bars supported at one end for reciprocation on said shaft, guide-straps on the other ends of the bars loosely supported on the frame, means for supporting the frame at an angle relative to the table, means for reciprocating the bars, and means carried by the bars to advance the material to the feed-rollers.

In testimony whereof I have hereunto set my hand in presence of two subscribing witnesses.

WILLIAM J. MITCHELL.

Witnesses:
M. D. BROWN,
FRANK C. SCHWARZ.